March 1, 1932.  G. D. SNELL  1,847,415

HOLDER FOR CANDY SUCKERS

Filed Dec. 31, 1929

Inventor
George D. Snell.
By A. J. O'Brien
Attorney

Patented Mar. 1, 1932

1,847,415

UNITED STATES PATENT OFFICE

GEORGE D. SNELL, OF DENVER, COLORADO, ASSIGNOR OF ONE-HALF TO SILVER S. SNELL, OF PORTLAND, OREGON

HOLDER FOR CANDY SUCKERS

Application filed December 31, 1929. Serial No. 417,650.

This invention relates to improvements in holders for candies and other confections.

It is customary to provide candy and other confections with a handle, one end of which is moulded in the candy. Such confections are called by various names, but are most frequently designated as "candy suckers" and "lollypops".

The handles employed are invariably made from wood and the end within the candy is nearly always sharpened.

Confections of the type referred to are sold almost exclusively to small children who grasp the stick and insert the candy into their mouth and who walk, run and crawl with the end of the handle projecting from the mouth.

It has frequently happened that children having one of these candy suckers in the mouth fall and that the end of the handle strikes the ground or floor, driving the candy into the throat, causing extremely painful injuries.

It has also happened that children have fallen at a time when the candy has been entirely removed from the end of the stick, so as to have the sharp end bare or almost bare. In such cases the sharp end of the stick has been driven into the roof of the child's mouth, or into its throat, thereby causing very serious injuries and sometimes death.

Injuries due to the use of rigid and sharpened sticks as handles for suckers, have become so numerous as to attract the attention of the public and to bring demands for prohibitive legislation that would prevent the sale of this type of confection.

It is the object of this invention to produce a handle or holder for candies and other confections which shall be so constructed that serious injury cannot be inflicted thereby, and which will therefore remove the danger that is now menacing our children.

This invention, briefly described, consists in providing the confection holders with a guard at the end that is embedded in the candy and which will prevent dangerous injuries if the holder is accidentally pushed into the child's mouth after the candy has been removed from the inner end. The improved holders are also, preferably, made from wire that is flexible so that if the child should fall and strike the end of the holder against the ground or floor, it will bend and will therefore not force the inner end into the child's throat.

Having thus briefly described the invention, it will now be described in detail and for this purpose reference will be had to the accompanying drawings in which the preferred embodiment has been illustrated and in which.

Figure 6:
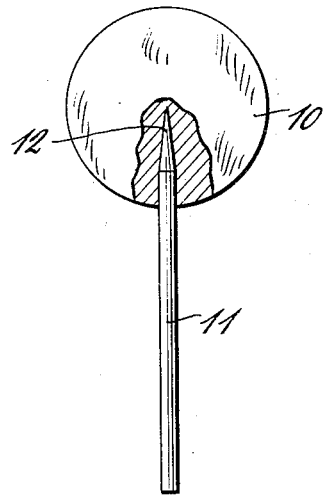
Fig. 6 is a view showing the ordinary holder now commonly employed.

In Fig. 6 I have shown the ordinary candy sucker which consists of a piece of candy 10 that may be round or any other shape, and which is provided with a wooden handle or holder 11. These holders are formed from a piece of wood and for convenience in manufacture, the end that is inserted into the candy is usually sharpened in the manner designated by reference numeral 12. When a sucker like this is given to a child, it inserts the candy in its mouth and the handle 11 extends outwardly. In running and playing it frequently happens the child falls and the candy is rammed into its throat. As long as a considerable amount of candy surrounds the sharpened end 12, no real serious injury can result, but as the candy disappears, the sharpened end 12 becomes bare and if the child then falls, the sharpened point of the stick is rammed into the roof of the child's mouth or into its throat with serious, and sometimes fatal injuries.

As explained above, it is the object of this invention to produce an improved holder that can be substituted for the one now in common use and which shall be so designed that serious injury will not be inflicted in case of accident.

Figure 1:
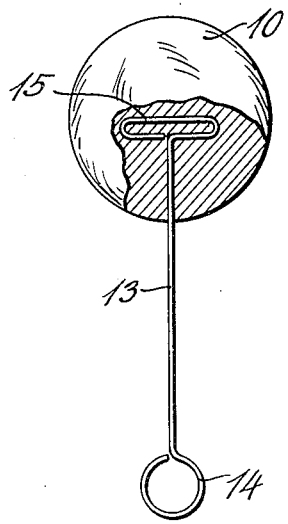
Fig. 1 is a view partly in section showing one form of my invention.

My improved holder in its simplest form has been illustrated in Fig. 1 in which reference numeral 13 designates the handle portion thereof. This holder is preferably formed from a single piece of readily bendable metal wire. The end of the wire that is to be embedded in the confection is formed into an oblong loop in the manner shown. The outer end may be bent into a circular loop like the one indicated by reference numeral 14. Since the wire is quite flexible, it is apparent that if a child should fall and strike the end of the handle against the ground or floor, that it will bend and will therefore not ram the confection into the child's throat. After the candy has been eaten so as to leave the loop 15 substantially bare, the danger of serious injury is still very small owing to the fact that this loop forms a blunt guard that will not readily penetrate the flesh and therefore any injury that might be caused would be slight in comparison with the injury that would be caused by a rigid sharpened wooden handle like the one shown in Fig. 6.

Figure 2:
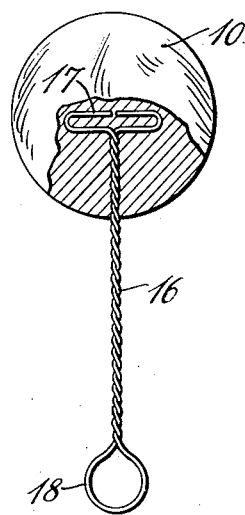
Fig. 2 is a view similar to that shown in Fig. 1 and illustrates another form of the invention.

In Fig. 2 I have shown a slightly modified form of holder in which the handle portion 16 is made from a twisted pair of wires whose ends are bent first outwardly and then inwardly so as to form a guard 17 that is similar to the corresponding guard 15 shown in Fig. 1. The outer end of the handle or holder may be formed into a circular loop 18 for convenience in holding the same. When the form shown in Fig. 2 is used, the wires may be smaller and the holder will present a somewhat more pleasing appearance.

Figure 3:
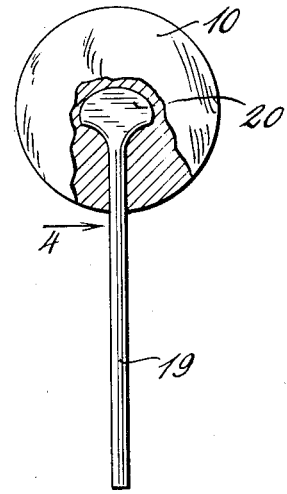
Fig. 3 is a view showing another embodiment of my invention.
Figure 4:
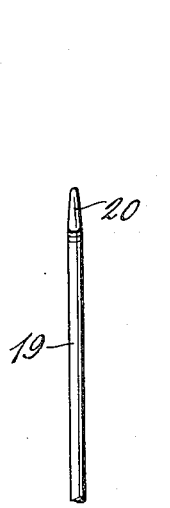
Fig. 4 is a side elevation of the holder shown in Fig. 3, this view being taken looking in the direction of the arrow 4.

In Fig. 3 I have shown how an ordinary wooden holder like the one indicated by reference numeral 11 in Fig. 6 can be modified so as to overcome to a great degree the danger to which attention has been called. The body of the holder shown in Fig. 3 has been designated by reference numeral 19, and the end is formed in the shape of a wide curved guard 20 that can be embedded in the candy in the manner shown. This guard member being blunt and of big area prevents any serious injury from being done if the holder should be pushed into the child's mouth as above explained.

Figure 5:
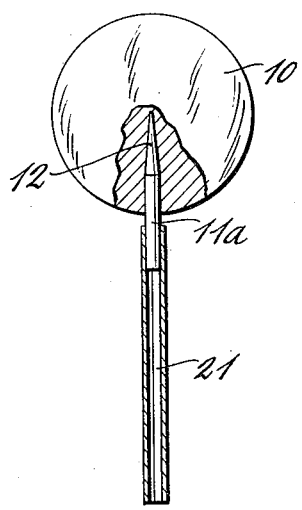
Fig. 5 is a view showing a still further modified form of my invention.

In Fig. 5 I have shown a still further modified form of my invention. In this form the part marked 11a corresponds to the handle portion 11 shown in Fig. 6 and is of the same material but very much shorter. Secured to the outer end of member 11a is a rubber tube 21. This tube is flexible and will readily bend and therefore since the rigid part 11a is short, it is evident that if a child falls the part 11a cannot be forced into its throat, because the rubber tube will bend and will not exert any force tending to move it inwardly as would a similar rigid member like 11 in Fig. 6.

From the above description it will be apparent that I have produced a holder for candy or other confections which is provided with a guard on the end that is embedded in the candy and which is preferably made from readily bendable material, and which, therefore, will not cause injury to a child if it falls or if some one should accidentally strike the end of the holder after the candy has been removed from the inner end.

Having described the invention what is claimed as new is:

A safety handle holder for candy, confections or the like, comprising, an elongated metal wire of readily bendable material but of sufficient rigidity to support the confection in an upright position, one end of the wire being formed into a loop that is adapted to be moulded into a piece of confection and which forms a guard for preventing injury.

In testimony whereof I affix my signature.

GEORGE D. SNELL.